United States Patent [19]
Tan et al.

[11] Patent Number: 5,838,558
[45] Date of Patent: Nov. 17, 1998

[54] PHASE STAGGERED FULL-BRIDGE CONVERTER WITH SOFT-PWM SWITCHING

[75] Inventors: F. Dong Tan, Irvine; Leonard Y. Inouye, Hermosa Beach, both of Calif.

[73] Assignee: TRW Inc., Redondo Beach, Calif.

[21] Appl. No.: 858,926

[22] Filed: May 19, 1997

[51] Int. Cl.$^6$ ............................................. H02M 5/42
[52] U.S. Cl. ............................ 363/91; 363/17; 363/98
[58] Field of Search ............................. 363/17, 98, 132, 363/91, 140, 41, 47

[56] References Cited

U.S. PATENT DOCUMENTS

| | | | |
|---|---|---|---|
| 4,039,925 | 8/1977 | Fletcher et al. | 363/70 |
| 4,122,515 | 10/1978 | Tachibana et al. | 363/45 |
| 4,467,388 | 8/1984 | Thoe | 361/145 |
| 4,864,479 | 9/1989 | Steigerwald et al. | 365/17 |
| 5,132,889 | 7/1992 | Hitchcock et al. | 363/17 |
| 5,157,592 | 10/1992 | Walters | 363/17 |
| 5,198,969 | 3/1993 | Redl et al. | 363/17 |
| 5,245,520 | 9/1993 | Imbertson | 363/17 |
| 5,325,283 | 6/1994 | Farrington et al. | 363/21 |
| 5,355,293 | 10/1994 | Carlstedt | 363/17 |
| 5,373,432 | 12/1994 | Vollin et al. | 363/16 |
| 5,418,703 | 5/1995 | Hitchcock et al. | 363/17 |
| 5,434,768 | 7/1995 | Jitaru et al. | 363/21 |
| 5,438,498 | 8/1995 | Ingemi | 363/17 |
| 5,442,540 | 8/1995 | Hua et al. | 363/98 |
| 5,500,791 | 3/1996 | Kheraluwala et al. | 363/17 |
| 5,530,639 | 6/1996 | Schulz et al. | 363/17 |
| 5,539,630 | 7/1996 | Pietkiewicz et al. | 363/17 |
| 5,541,827 | 7/1996 | Allfather | 363/17 |
| 5,541,828 | 7/1996 | Rozman | 363/21 |
| 5,563,775 | 10/1996 | Kammiller | 363/17 |
| 5,568,368 | 10/1996 | Steigerwald et al. | 363/17 |

*Primary Examiner*—Shawn Riley
*Attorney, Agent, or Firm*—Michael S. Yatsko

[57] ABSTRACT

A full-bridge converter 10 is provided which performs soft switching based on pulse width modulated switching signals. The, converter 10 includes a primary side 12 and a secondary side 14 interconnected through a transformer 13. The primary side 12 includes a power source connected in parallel with leading and trailing legs 20 and 22, respectively. The leading leg 20 includes first and second switching transistors Q1 and Q2 connected in series, while the trailing leg 22 includes third and fourth switching transistors Q3 and Q4 connected in series. The switching transistors Q1–Q4 each include parasitic diodes D1–D4 and parasitic capacitances C1–C4. A control circuit 15 generates pulse width modulated (PWM) switching signals applied to gates G1–G4 of the transistors Q1–Q4. The control circuit 15 simultaneously turns on transistors Q1 and Q3 during a first energy transfer stage and simultaneously turns on transistors Q2 and Q4 during a second energy transfer stage. Control circuit 15 varies the time during which transistors Q3 and Q4 are turned on during the first and second energy transfer stages to maintain a desired minimum output voltage. The control circuit 15 provides a free-wheeling stage and transition stages between the energy transfer stages to effect soft switching through the use of PWM switching signals.

13 Claims, 10 Drawing Sheets

PHASE STAGGERED FULL-BRIDGE CONVERTER WITH SOFT-PWM SWITCHING

BACKGROUND OF THE INVENTION

The present invention generally relates to zero-voltage or zero-current switched ("soft switched") DC-to-DC converters. In particular, the invention relates to a switching converter that achieves nearly lossless switching using pulse width modulation control of switching transistors in a full-bridge converter.

In the past, DC-to-DC converters have been proposed for converting a DC input voltage from one voltage level to a different DC output voltage level. Typically, full-bridge DC-to-DC converters include a primary side which converts the DC input voltage into a series of DC pulses. The primary side applies the DC pulses to a primary winding of a transformer which induces a voltage potential across a secondary winding of the transformer within a secondary side of the converter.

The primary side may be divided into a leading leg and a trailing leg connected in parallel with one another and with the incoming power source. Each of the leading and trailing legs include at least a pair of switching devices (e.g., transistors) connected in series via center nodes in the leading and trailing legs. The primary winding is connected between the center nodes of the leading and trailing legs. By interconnecting the switching transistors and the primary side of the transformer in the above described manner, the transistors may be selectively switched to reverse the direction of current flow through the primary winding of the transformer. Current flow through the primary winding of the transformer generates an electromagnetic field which the transformer core guides through the secondary winding, thereby setting up a voltage across the secondary winding. This voltage is a function of the ratio of the number of turns in the secondary winding to the number of turns in the primary winding.

The secondary winding of the transformer is connected in parallel with a diode bridge rectifier and a low-pass filter to rectify and filter the output voltage of the secondary winding to produce a desired DC voltage at the output terminal of the converter. The diode bridge rectifying circuit uses a combination of diodes connected in series with one another and aligned in opposed directions to effect rectification. In the past, diode bridge rectifying circuits proposed within DC-to-DC converters have experienced losses due to "reverse recovery" inherent within the operation of rectifier diodes in the bridge rectifying circuit. During the reverse recovery period, a forward conducting diode is in the process of switching from a forward conducting state to a reverse blocking state. During the reverse recovery period, the diode does not block current in the reverse direction, but allows current to flow "backwards" through the diode until the diode enters its normal reverse blocking state. Power loss occurs during this switching process. Reverse recovery of the diodes also induces additional losses in the primary switches.

In the past, DC-to-DC converters have been proposed which effect regulation of the output voltage based on a "hard switching" control operation. A hard switching type of converter operates such that the internal switching transistors change between on and off states while large voltage potentials exist across the transistors and while large currents are flowing through the transistors.

Hard switching converters have met with limited success in high frequency applications, since the hard switching operation causes large power losses during the switching operation. The power losses incurred during the hard switching operation are directly proportional to switching frequency. Thus, as the switching frequency increases, the losses increase.

Moreover, in hard switching converters, the parasitic effects within the components (e.g., the transistors, transformer and the like), cause current and voltage ringings which generate large amounts of electromagnetic interference (EMI). EMI is undesirable because it may interfere with the operation of nearby circuitry.

Power losses due to switching are undesirable as they lower the converter efficiency. The lower the efficiency of the converter, the more input power is wasted to generate a desired amount of output power, thereby leading to higher costs per unit of output power. More importantly, the excessive power dissipation may damage the switches. Examples of parasitic effects include, but are not limited to, parasitic capacitance, leakage inductance created by imperfections in the transformer coils, and diode reverse recovery effects.

Lower switching losses allow the converter to use higher switching frequencies. Higher switching frequencies, in turn, allow the use of smaller passive components and a corresponding reduction in size and weight of the converter. Generally, small size and light weight are desirable in a switching converter. Thus, it is desirable to operate the converter at a high frequency. However, as noted above, hard switching converters have been unable to operate effectively at high frequencies.

In an attempt to overcome some of the disadvantages of hard switching converters, a different type of converter has been proposed generally referred to as a "soft switching" converter. Soft switching converters operate such that the switching transistors within the primary side of the converter change states while having low voltage potentials there across and low levels of current flowing therethrough. Soft switching converters attempt to take advantage of the parasitic effects of the components within the converter in order to reduce the voltage potentials across and current flows through the switches before effecting a switching operation.

More specifically, soft switching converters adjust the switch timing in order to charge and to discharge the parasitic switch capacitances of the transistors through the use of current supplied by the magnetizing inductance of the primary winding of the transformer, thereby reducing the voltage across off or open transistors and current flow through on or closed transistors at the time such transistors switch states. Soft switching reduces the power losses during the switching operation, thereby enabling the converter to operate at higher frequencies, with higher efficiency and with reduced electromagnetic interference.

One of the popular soft switching converters is called a phase-shift full-bridge converter and uses a phase-shift control technique. Examples of such phase-shift control techniques are illustrated in U.S. Pat. No. 5,442,540 to Hua et al., U.S. Pat. No. 5,132,889 to Hitchcock, et al., U.S. Pat. No. 5,157,592 to Walters, U.S. Pat. No. 5,539,630 to Pietkiewicz and U.S. Pat. No. 4,864,479 to Steigerwald et al.

However, the operation of a typical phase-shift, full-bridge converter is deficient in three areas: Failure to support soft switching at light loads, switching loss caused by rectifier diode reverse recovery, and additional circuitry required to phase-shift the control signals. Typically, the load must draw 50% of the nominal load current in order to ensure soft switching for primary switching devices. Consequently, the stress on the switching devices is similar to that in a hard switched converter, defeating the purpose of introducing soft switching. The loss associated with reverse recovery of rectifier diodes not only increases losses through the rectifier diodes themselves but also induces additional losses in the primary switching devices. In addition, reverse recovery of rectifier diodes increases the required voltage ratings for rectifier diodes and the primary switching devices. Furthermore, the added complexity of phase-shift control increases the size, weight, and power consumption of such a converter.

A need remains within the industry for an improved DC-to-DC converter using a simple pulse-width-modulation scheme that can maintain soft switching, even at light loads. It is an object of the present invention to meet this need.

BRIEF SUMMARY OF THE INVENTION

It is an object of the present invention to provide a DC-to-DC converter which performs soft switching under the control of pulse width modulated switching signals.

It is a corollary object of the present invention to provide a DC-to-DC converter having a simple control circuit which is able to operate at high frequency.

It is a further object of the present invention to minimize the diode bridge rectifier reverse recovery losses.

It is a further object of the present invention to provide a DC-to-DC converter with increased efficiency.

It is a further object of the present invention to provide a DC-to-DC converter which reduces the amount of electromagnetic interference generated during operation.

It is another object of the present invention to provide a DC-to-DC converter which regulates DC voltage output over a wide range of loads including very light loads, while maintaining soft switching.

It is yet another object of the present invention to provide a DC-to-DC converter with reduced size, weight and cost.

DETAILED DESCRIPTION OF THE INVENTION

Figure 1:
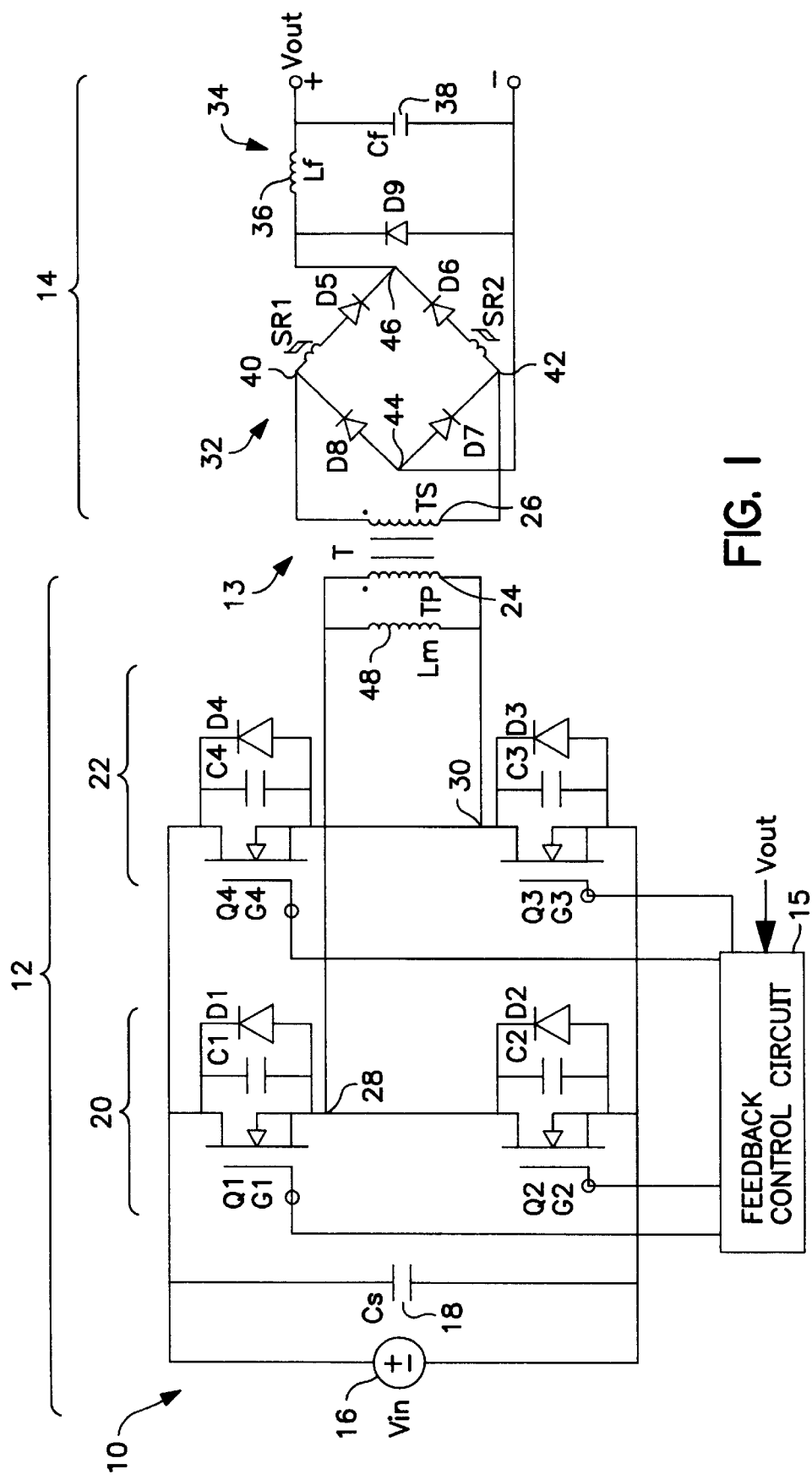
FIG. 1 illustrates a schematic diagram of a DC-to-DC converter according to the preferred embodiment of the present invention utilizing full-bridge soft switching pulse width modulated control.

Referring now to FIG. 1, a full-bridge converter 10 is illustrated which performs soft switching based on pulse width modulated (PWM) switching. The full-bridge converter 10 includes a primary side 12 and a secondary side 14 interconnected through a transformer 13. The primary side 12 includes a power source 16 and an input capacitor 18 connected in parallel with a leading leg 20 and a trailing leg 22. The leading leg 20 includes first and second switching transistors Q1 and Q2, respectively, connected in series. The trailing leg 22 includes third and fourth switching transistors Q3 and Q4, respectively, connected in series.

A transformer 13 includes primary and secondary windings 24 and 26, and a magnetizing inductance 48. A primary winding 24 of the transformer 13 is connected at nodes 28 and 30 to the leading and trailing legs 20 and 22, respectively. The secondary winding 26 of the transformer 13 is connected in parallel to a full-bridge rectifier 32, a free wheeling diode D9 and a low pass filter 34. The low pass filter 34 includes an inductor 36 and a capacitor 38. The diode bridge 32 includes four diodes D5–D8 connected in standard bridge configurations. The diode bridge 32 is connected at nodes 40 and 42 to the secondary side 26 of the transformer 13, and at nodes 44 and 46 to the free wheeling diode D9. The diode bridge 32 includes saturable reactors SR1 and SR2 connected in series with diodes D5 and D6, respectively, in the first and second legs. As explained below, the saturable reactors SR1 and SR2 and the free wheeling diode D9 help support soft-PWM switching and allow the device to eliminate reverse recovery losses.

The input of the converter 10 is driven by the power source 16 which produces an input voltage Vin. Input capacitor 18 smoothes the input voltage Vin and stores energy returned to the source 16 from the components of the primary side 12 during switching. Switching transistors Q1–Q4 may be formed from metal oxide semiconductor field effect transistors (MOSFETS) and the like. Optionally, other types of switching elements may be utilized so long as the elements include, or are connected to circuits that emulate, parasitic capacitance and diode characteristics which may be utilized as explained below in connection with the preferred embodiment of the present invention.

The switching transistors Q1–Q4 are connected to form a full-bridge on the input side of the converter 10. Each of the switching transistors Q1–Q4 inherently includes a parasitic diode and a parasitic capacitance. Thus, the parasitic diodes D1–D4 and parasitic capacitances C1–C4 are illustrated as being connected in parallel across the drain and source of associated transistors Q1–Q4. The parasitic diodes D1–D4 and capacitances C1–C4 are inherently associated with the switching transistors Q1–Q4. The transistors Q3, Q4 are turned on and off by pulse width modulated (PWM) switching signals received at the gates G3–G4. By way of example only, the PWM switching signals may be modulated whereby each transistor Q3–Q4 is turned on upon receipt of a high pulse at the gate G3–G4 and remains on until the pulse goes low. Transistors Q1 and Q2 are switched by approximately 50% duty cycle control signals running at the converter 10 operating frequency. The switching signals are generated by a feed back control circuit 15 (explained in more detail below).

The output of the secondary winding 26 is rectified through the diode bridge 32 built from the diodes D5–D8. Two legs of the diode bridge 32 contain saturable reactors SR1 and SR2 in series with the diodes D5 and D6, respectively. The saturable reactors SR1 and SR2 operate in the same manner as a switch and reduce the diode reverse recovery losses (as explained in more detail below). The free wheeling diode D9, connected in parallel across the output of the diode bridge 32, conducts in order to allow the output current to continue to flow to the load when the voltage drop across the transformer secondary winding 26 approaches zero. Finally, the output of the diode bridge rectifier 32 passes through the low pass filter 34, which includes the inductor 36 and the capacitor 38 to provide the output voltage Vout.

The feedback control circuit 15 senses the output voltage Vout and adjusts the timing of the PWM switching signals applied to the gates G3–G4 of the transistors Q3–Q4 to turn transistors Q3–Q4 on and off. The feedback control circuit 15 may use any conventional voltage sensing circuit to sample output voltage Vout, including an analog to digital converter (not shown). The feedback control circuit 15 may also include a microcontroller which analyzes the digital representation of the output voltage Vout, determines what adjustments to make to the switch timing, and provides switching signals to the gate G1–G4 to control the transistors Q1–Q4. Thus, the entire feedback control circuit 15 may be implemented with a single microcontroller, though discrete logic circuits may also be used to build the control circuit 15.

Turning to FIGS. 2A–2E, a step-by-step analysis is provided of the first half cycle of the converter 10 shown in FIG. 1.

Figure 2A:
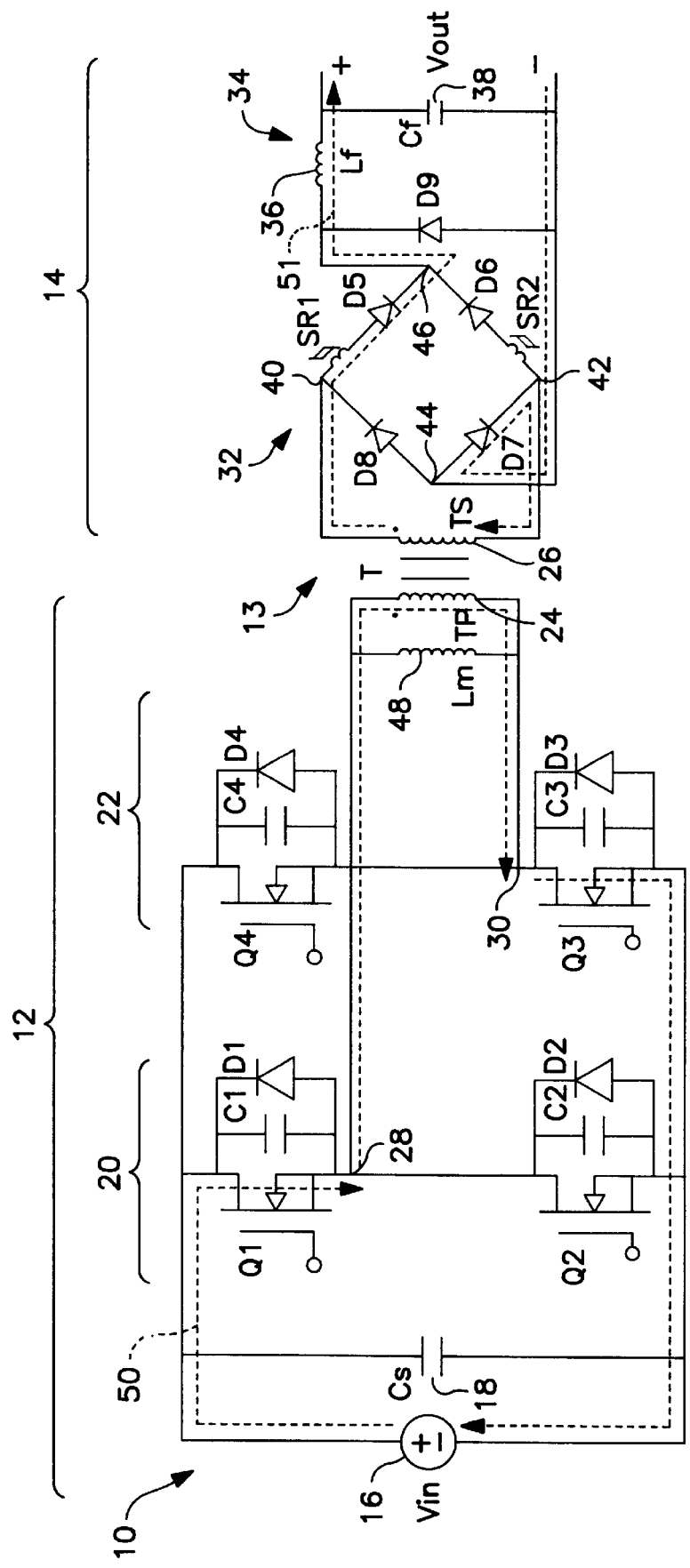
FIG. 2A illustrates the current flow paths through the DC-to-DC converter of FIG. 1 during a first energy transfer stage (stage 1).

FIG. 2A illustrates the converter 10 while in an "energy transfer stage". The converter 10 initiates the energy transfer stage by soft switching transistors Q1 and Q3 to on states. The energy transfer stage continues until transistor Q3 is turned off. When transistors Q1 and Q3 are both on, the input power supply Vin transfers energy to the transformer primary winding 24 via the path illustrated by arrow 50. Current flows through transistor Q1, primary winding 24, transistor Q3 and back to Vin. As the current flows through the primary winding 24, current builds up in the inductance 48. As explained below, the current buildup in inductance 48 is later used to charge capacitor C3. Transistors Q1 and Q3 remain on during the energy transfer stage.

As current flows through the primary winding 24, a voltage develops across the transformer secondary winding 26 on the secondary side 14 that is a function of the turns ratio of the transformer 13 and the input voltage Vin. Current on the secondary side 12 flows from node 40 through saturable reactor SR1, diode D5, node 46, low pass filter 34, to the load (as illustrated by arrow 51). The current then flows back through node 44 and diode D7 to the opposite end of the secondary winding 26 (as illustrated by arrow 53). Diodes D6 and D8 are reverse biased and thus are in fully reverse blocking states.

The current flow through saturable reactor SR1 forces the saturable reactor SR1 into a low impedance saturation state after a very brief forward blocking state during which the saturable reactor SR1 transitions to the low impedance state. In saturation, the saturable reactor SRI acts like a short circuit in that it presents substantially zero resistance to current flow. As a result, minimum power is dissipated across the saturable reactor SR1 while current is flowing therethrough. The rectified voltage output of the diode rectifier 32 keeps the free-wheeling diode D9 turned off.

Figure 3:
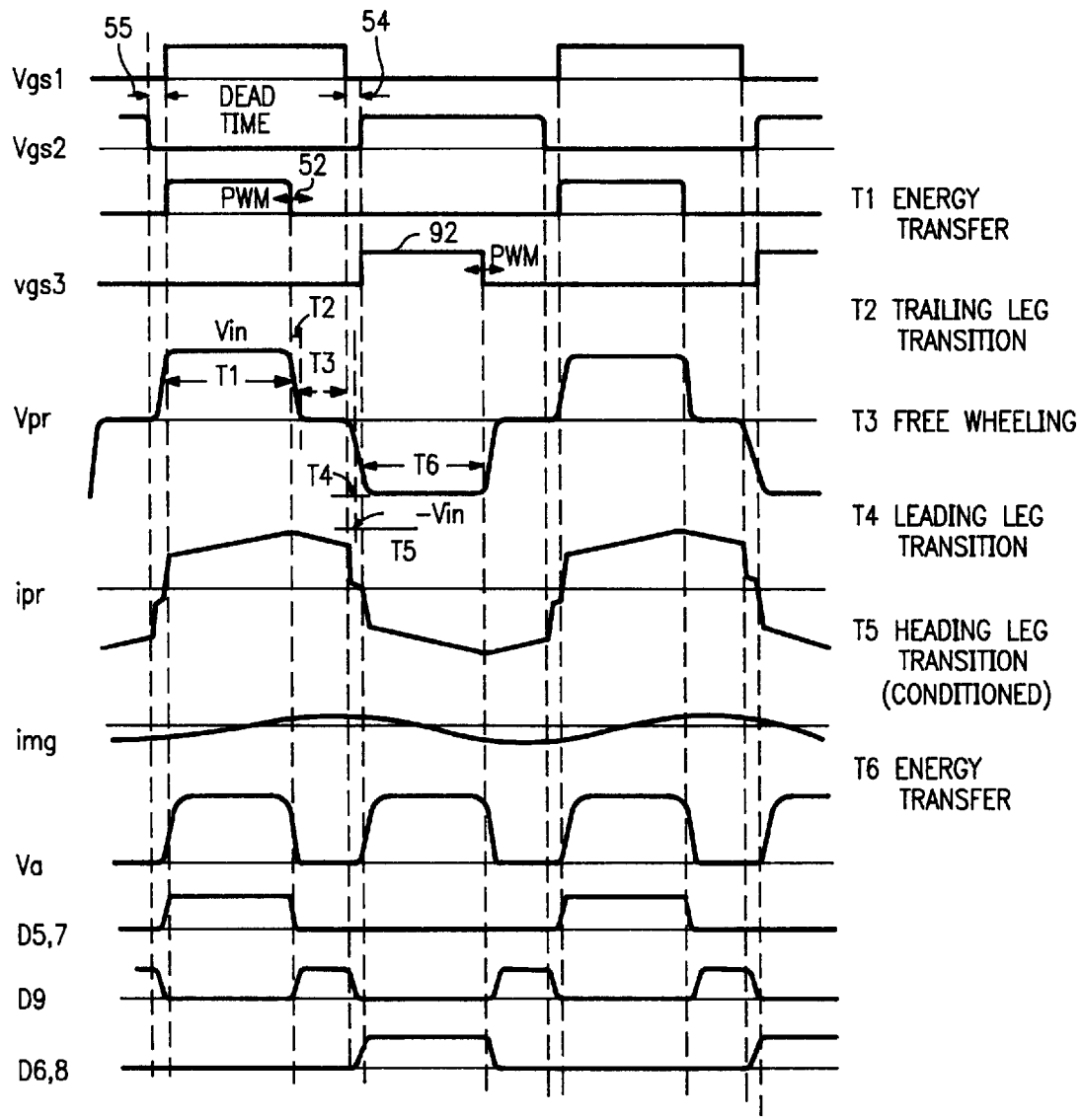
FIG. 3 illustrates exemplary wave forms representative of the internal operation of the converter of FIG. 1.

FIG. 3 illustrates several waveforms within the converter 10 during different stages of the soft switching operation as controlled by the signals supplied to gates G1–G4. In FIG. 3, Vgs1–Vgs4 represent the voltage waveforms that appear across the gates G1–G4 to the source terminals of the transistors Q1–Q4, respectively. The feedback control circuit 15 controls waveforms Vgs1–Vgs4 through the PWM switching signals. FIG. 3 also shows the current Img determined by input voltage 16 and the magnetizing inductance 48. The current through diodes D5 and D7 is identical and shown as Id5 and Id7. The current through diodes D6 and D8 is identical and shown as Id6 and Id8. Current through the free-wheeling diode 9 is denoted Id9. Waveforms Vpr and Ipr show the voltage and current respectively across the primary winding 24. The time interval T1 denotes the time during which the system remains in the energy transfer stage. During time interval T1, the voltage Vpr rises and the current Ipr builds in the transformer primary winding 24 as shown in FIG. 3.

As illustrated in FIG. 3, transistors Q1 and Q3 are turned to an on state simultaneously since the switching signals Vgs1 and Vgs3 switch to a high state simultaneously. There is no delay between the times at which the transistors Q1 and Q3 are turned on. This simultaneous operation differs from the phase-shift soft switching converters known in the past in which the times differ at which transistors Q1 and Q3 are turned on by a delay determined by the phase difference.

In the preferred embodiment of the present invention, the time period during which the transistor Q3 remains on is based on PWM. The length of the energy transfer stage is determined by the width of the pulse (indicated in FIG. 3 by arrow 52) in the waveform Vgs3. The width of the pulse in waveform Vgs3 is extended as the amount of energy increases which should be transferred to the load as determined by the control circuit 15. For example, if the output voltage Vout starts to sag, the control circuit 15 extends the width of waveform Vgs3 to transfer more energy to the load.

In the preferred embodiment, the leading leg 20, which comprises transistors Q1 and Q2, is operated at a duty cycle nominally of 50%, with a small dead time provided in which neither transistor Q1 nor transistor Q2 is turned on (as indicated in FIG. 3 by arrows 54 and 55). The trailing leg 22, which comprises transistors Q3 and Q4, is controlled with pulsed width modulated switching signals to provide control over the output voltage Vout. In particular, the times during which transistor Q3 is turned on (during the first half cycle) and transistor Q4 is turned on (during the second half cycle) are varied by adjusting the width of the switching pulses in the waveforms Vgs3 and Vgs4 in order to adjust the output voltage of the converter 10 to a predetermined level. Thus, the length of the first energy transfer stage (of the first half cycle) varies with the width of the pulse in waveform Vgs3. The control circuit 15 determines when to turn off transistor Q3 by evaluating the feedback level of the output voltage Vout. Although transistor Q1 and transistor Q3 are turned on at the same time, transistor Q3 stays on for a variable amount of time.

Next, a trailing leg transition stage is described in connection with FIGS. 2B and 3. The trailing leg transition stage is initiated when the control circuit 15 ends the energy transfer stage by turning off transistor Q3 while maintaining transistor Q1 in a conductive state. The time interval associated with the trailing leg transition stage is indicated in FIG. 3 at time interval T2. During the trailing leg transition time interval T2, current continues to flow in the direction shown by the arrows 50 and 56 in FIG. 2B due to the current previously built up in the magnetizing inductance 48 in the transformer 13 during the energy transfer stage (stage 1) (discussed above in connection with FIG. 2A). The current flow maintained by inductance 48 charges capacitor C3 to nearly the input voltage Vin. When the capacitor C3 is charged to approximately Vin, the voltage across the transformer primary winding 24 is approximately equal to zero since transistor Q1 remains on and the full input voltage Vin is now present on both sides of the transformer primary winding 24. When the voltage potential across capacitor C3 is slightly higher than the voltage Vin, diode D4 becomes forward biased and enters a conductive state, thereby beginning a free-wheeling stage (stage 3, discussed below in connection with FIG. 2C).

Figure 2B:
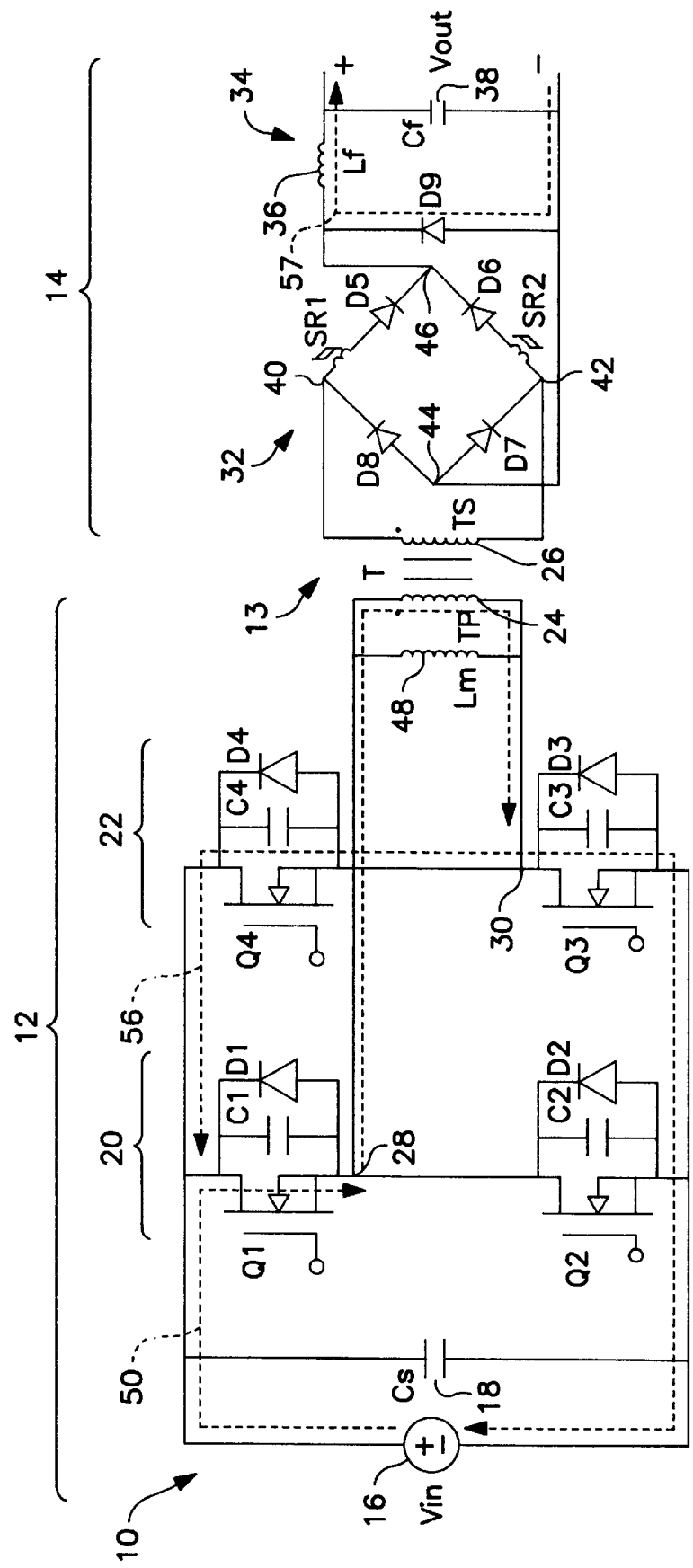
FIG. 2B illustrates the current flow path through the DC-to-DC converter of FIG. 1 during a trailing leg transition stage (stage 2).

Still referring to FIG. 2B, on the secondary side 14, during the trailing leg transition stage T2 the voltage at the transformer secondary winding 26 also falls to approximately zero as the voltage across the transformer primary winding 24 approaches zero. Diode D5 begins to turn off and enters a reverse recovery period as the voltage across the rectifier 32 is reduced. However, the load current is diverted to the free wheeling diode D9, before D5 is turned off. That is, D5 is switched when zero current is flowing through it (zero-current switching). Saturable reactor SR1 comes out of saturation during the transition. The saturable reactor SR1 operates with a large impedance when not in a saturation state. Thus, while in a non-saturated state, the impedance of the saturable reactor SR1 severely limits the magnitude of the diode reverse current and therefore reduces the associated power loss.

Furthermore, the impedance of the saturable reactor SR1 limits the voltage and current across the diode and thus reduces the amount of electromagnetic interference generated when the diode D5 is turned off and lowers the physical stress on the diode D5. Thus, the diodes, like the switching transistors, are soft switched. Because the voltage across the secondary winding 26 approaches zero, the secondary winding 26 appears as a short circuit between the cathodes of diodes D7 and D8 and the anodes of diodes D5 and D6. During this short circuit period, the saturable reactors SR1 and SR2 block current flow through the load and back through the secondary winding 26, thereby ensuring that the entire magnetizing energy is available for use by the primary side to do soft switching. Finally, when the transformer secondary winding 26 output voltage falls sufficiently, it causes the free-wheeling diode D9 to begin conducting a load current in order that current may flow along the path indicated by arrow 57.

Figure 2C:
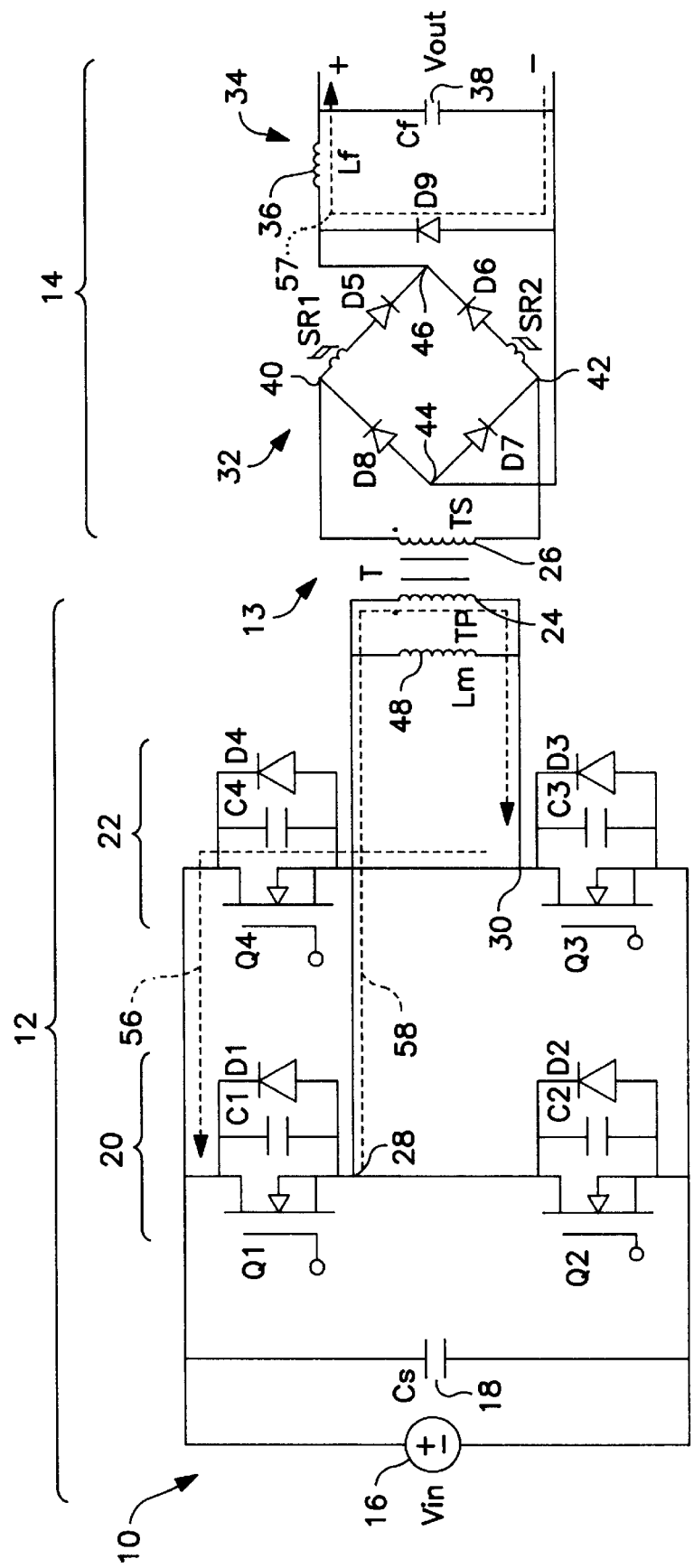
FIG. 2C illustrates the current flow path through the DC-to-DC converter of FIG. 1 during a free wheeling stage (stage 3).

Next, the free-wheeling stage is described in connection with FIGS. 2C and 3. During the free-wheeling stage, transistor Q1 remains in an on state, and transistor Q3 remains in an off state. Referring to FIG. 3, the time interval T3 identifies the free-wheeling stage. The free-wheeling stage begins (and the trailing leg transition leg ends) when the voltage on capacitor C3 rises to the point where diode D4 turns on and clamps the voltage on capacitor C3 to the source voltage Vin plus one diode drop. By way of example, the diode drop may equal 0.7 volts, but will vary depending upon the type of diode used. The magnetizing inductance 48 continues to maintain current in a circulating loop through transistor Q1, the primary winding 24, diode D4, and back to transistor Q1 as denoted by arrows 56 and 58. The circulating loop continues during a period known as the free-wheeling period. Since the magnetizing inductance 48 is typically large, only a small amount of current is needed to sustain the current circulation. The voltage across the transformer primary winding 24 is approximately zero. Even though diode D4 is conducting, the control circuit 15 does not turn on transistor Q4.

On the secondary side 14, the voltage across the transformer secondary winding 26 also approaches zero. The inductor 36 of the filter 34 continues to provide a current to the output load, thereby keeping Vout approximately constant. Saturable reactor SR1, saturated earlier, remains reverse blocking, while saturable reactor SR2 is about to enter a forward blocking state during the free-wheeling period by transitioning from a high impedance state to a low impedance forward conducting state while diode D9 continues to free wheel.

Figure 2D:
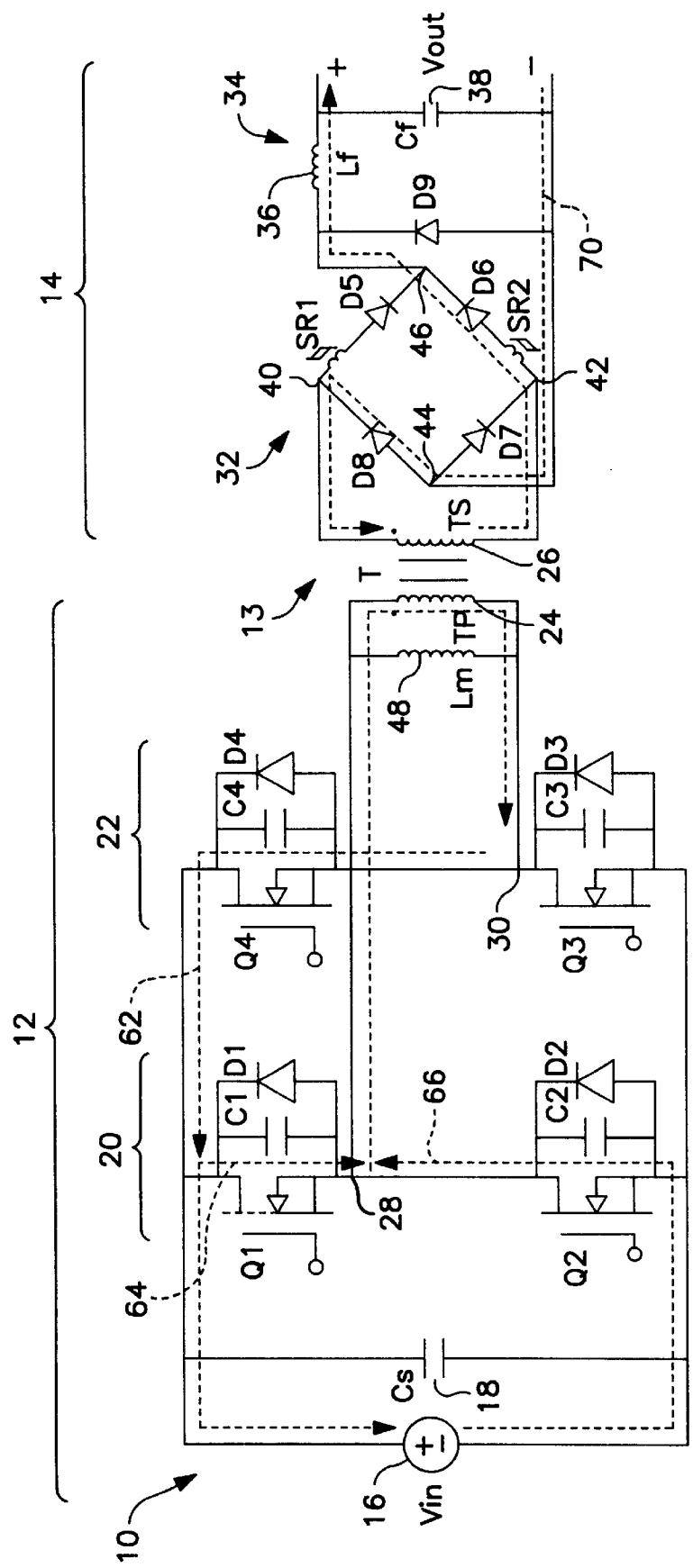
FIG. 2D illustrates the current flow path through the DC-to-DC converter of FIG. 1 during a first part of the leading leg transition stage (stage 4).

Next, part one of a leading leg transition stage (stage 4) is described in connection with FIGS. 2D and 3. The control circuit 15 initiates part one of the leading leg transition stage by turning transistor Q1 off based on a predetermined converter operating frequency. Referring to FIG. 3, the time interval T4 represents the duration of part one of the leading leg transition stage. The magnetizing inductance 48 maintains current flow in the direction indicated by arrows 60–66 in FIG. 2D. Current flow through capacitor C1 is in the direction of arrow 64 even though the transistor Q1 is turned off. The inductive current flow maintained by inductance 48 decreases the voltage across capacitor C2 to approximately zero. As the voltage across capacitor C2 falls, the voltage across the transformer primary winding 24 begins to build (as shown at Vpr in FIG. 3). During part one of the leading leg transition stage, the polarity of voltage Vpr is opposite to the polarity of voltage Vpr during the energy transfer stage. The voltage on capacitor C2 continues to fall until diode D2 starts conducting, thereby clamping the voltage on capacitor C2 to the negative input voltage minus one diode drop (e.g., 0.7 volts). Now that the voltage across transistor Q2 is virtually zero, it is ready to be turned on under soft switching conditions. Note that even though diode D2 is conducting, the control circuit 15 maintains transistor Q2 in an off state.

On the secondary side 14, when the voltage across the transformer secondary winding 26 begins to build, current flow is established from the transformer secondary winding 26 through the saturable reactor SR2 (which saturates accordingly), through diode D6, the output filter 34, the load, diode D8 and back to the transformer secondary winding 26 (as indicated by arrows 68 and 70). Diode D9 stops free wheeling when the bridge rectifier 32 output voltage rises high enough to reverse bias the diode D9. Current ceases to flow through D9 and begins to flow through D6. The leading leg transition time is approximately the same as the trailing leg transition time since the energy stored in the magnetizing inductance 48 substantially contributes in both cases. The relatively symmetrical transition times of the trailing leg and part one of the leading leg provide another advantage over the prior art by allowing the control circuit 15 to soft switch under light loads.

Figure 2E:
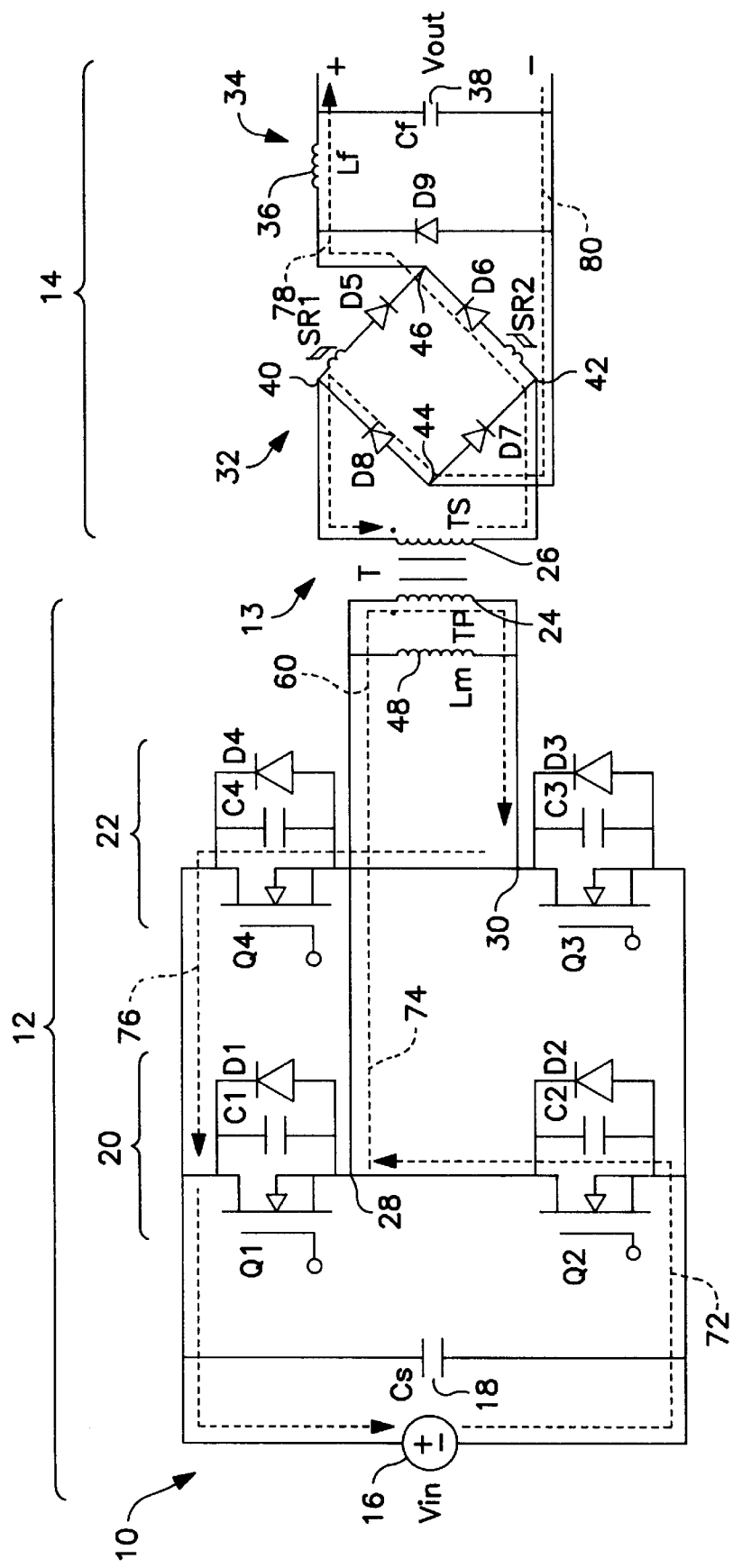
FIG. 2E illustrates the current flow path through the DC-to-DC converter of FIG. 1 during a second part of the leading leg transition stage (stage 5).

Next, part two of the leading leg transition stage is discussed in connection with FIGS. 2E and 3. Rather than transitioning to a stage when transistors Q4 and Q2 are directly turned on, the control circuit 15 continues to hold transistors Q4 and Q2 off for a period of time. Referring to FIG. 3, part two of the leading leg transition stage is indicated at time interval T5. The magnetizing inductance 48 maintains the load current by forcing current flow through diodes D4 and D2. During part two of the leading leg transition time interval T5, current flows through source Vin, diode D2, primary winding 24, diode D4, and back to the source Vin (as illustrated by arrows 72, 74, and 76). Hence, Q2 and Q4 are ready to turn on at zero voltage.

At the end of part two of the leading leg transition stage, the control circuit 15 initiates a transition to the second energy transfer stage. Recall that transistor Q4 was not turned on during the free-wheeling stage (time interval T3). The control circuit 15 waits to turn on transistor Q4 until the control circuit 15 is also ready to turn on transistor Q2 since current is already flowing through diode D4. Thus, no phase-shift is necessary (which would have been the case if transistor Q4 was turned on earlier than transistor Q2), and transistors Q2 and Q4 can be turned on simultaneously. As a result, the control circuit 15 can eliminate previously required phase-shift control signals and use PWM control over transistor Q4 (by adjusting the width of the waveform Vgs4 pulse) to adjust the output voltage while maintaining soft switching.

Turning to the secondary side 14, the load current continues to flow through the transformer secondary winding 26, the saturable reactor SR2, diode D6, the output filter 34, the load, diode D8 and back to the transformer secondary winding 26 (as illustrated by arrows 78 and 80).

The above description concludes the first half cycle during which current flow in a first direction was initiated and ended through the primary winding 24.

Next the converter 10 continues through a second half cycle. The operation of the converter 10 during the second half cycle is symmetrical to the operation of the converter 10 during the first half cycle. For example, transistor Q4 is operated under PWM control in the same manner as transistor Q3 was in the first half cycle. An independent PWM control signal, shown as Vgs4 in FIG. 3 controls transistor Q4, however.

Figure 2F:
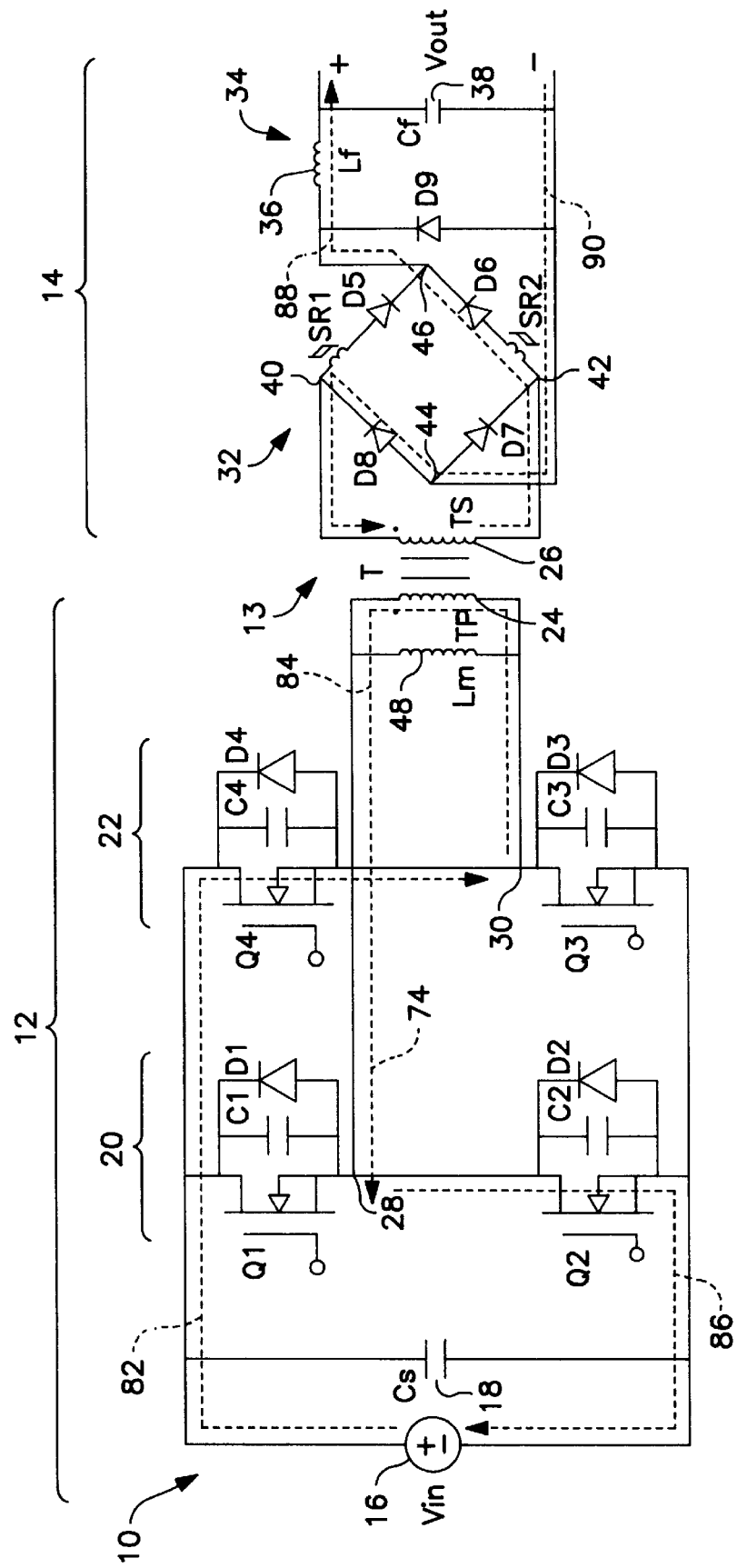
FIG. 2F illustrates the current flow path through the DC-to-DC converter of FIG. 1 during a second energy transfer stage (stage 6).

The first stage of the second half cycle, the energy transfer stage, is described in connection with FIGS. 2F and 3. The second energy transfer stage begins when transistors Q4 and Q2 are both simultaneously switched on by the control circuit 15. Referring to FIG. 3, the second energy transfer stage is indicated at time interval T6. Because both diode D4 and diode D2 were conducting prior to the beginning of the second energy transfer stage, transistors Q4 and Q2 are turned on with a voltage potential thereacross substantially corresponding to the diode voltage drop (e.g., 0.7 volts) across diodes D4 and D2. In other words, transistors Q4 and Q2 are soft switched, in a manner identical to the soft switching technique utilized above in connection with the first energy transfer stage for transistors Q1 and Q3. The input power supply Vin transfers energy to the transformer primary winding 24 in a direction reverse to the direction of energy transfer during the first energy transfer stage (described above in connection with FIG. 2A). The polarity of the voltage applied across the primary winding 24 during the second energy transfer stage is opposite to the polarity of the voltage applied across the primary winding 24 during the first energy transfer stage when transistors Q1 and Q3 were on.

Current flows through transistor Q4 and magnetizing inductance 48, thereby again building up current in the inductance 48, but in an opposite direction, see arrow 84. The current built up in the inductance 48 will be used in subsequent free wheeling and leading leg transition stages as described above in connection with FIGS. 2D and 2C. The current continues to flow through transistor Q2 back to source Vin (as illustrated by arrows 82, 84 and 86). Both capacitor C1 and capacitor C3 charge to the input voltage Vin during the second energy transfer stage.

On the secondary side 14, a voltage develops across the transformer secondary winding 26 that is a function of the turns ratio of the transformer 13. The voltage potential across the transformer secondary winding 26 has a polarity that is opposed to the polarity of the voltage developed across secondary winding 26 during the first energy transfer stage (described above in connection with FIG. 2A). Current on the secondary side 14 flows through saturable reactor SR2, diode D6, the output filter 34, the load, then back to diode D8 to the secondary winding 26 (as illustrated by arrows 88 and 90). Diodes D5 and D7 are reverse biased and are fully in their reverse blocking state during the second energy transfer stage. The current flow through saturable reactor SR2 forces the saturable reactor SR2 into a saturation stage, during which minimum power is dissipated across the saturable reactor SR2 as it acts as a virtual short circuit while current is flowing therethrough. The output of the diode bridge rectifier 32 forces the free-wheeling diode D9 into an off state.

The rest of this half cycle is symmetrical to that of the first cycle. Detailed description is hence omitted.

The converter 10 continues operating through the second half cycle in a manner symmetrical to that of the first half cycle. A detailed description of the second half cycle is therefore contained in the description of the first half cycle, except that symmetric circuit components should be substituted. In other words, in the second half cycle, the above-described operation of Q3 applies now to the operation of Q4 and vice versa; the above-described operation of diodes D1 and D3 applies to the operation of diodes D2 and D4 and vice versa, etc. Once the second half cycle is complete, the converter 10 continues operation in the first half cycle once again.

Figure 4:
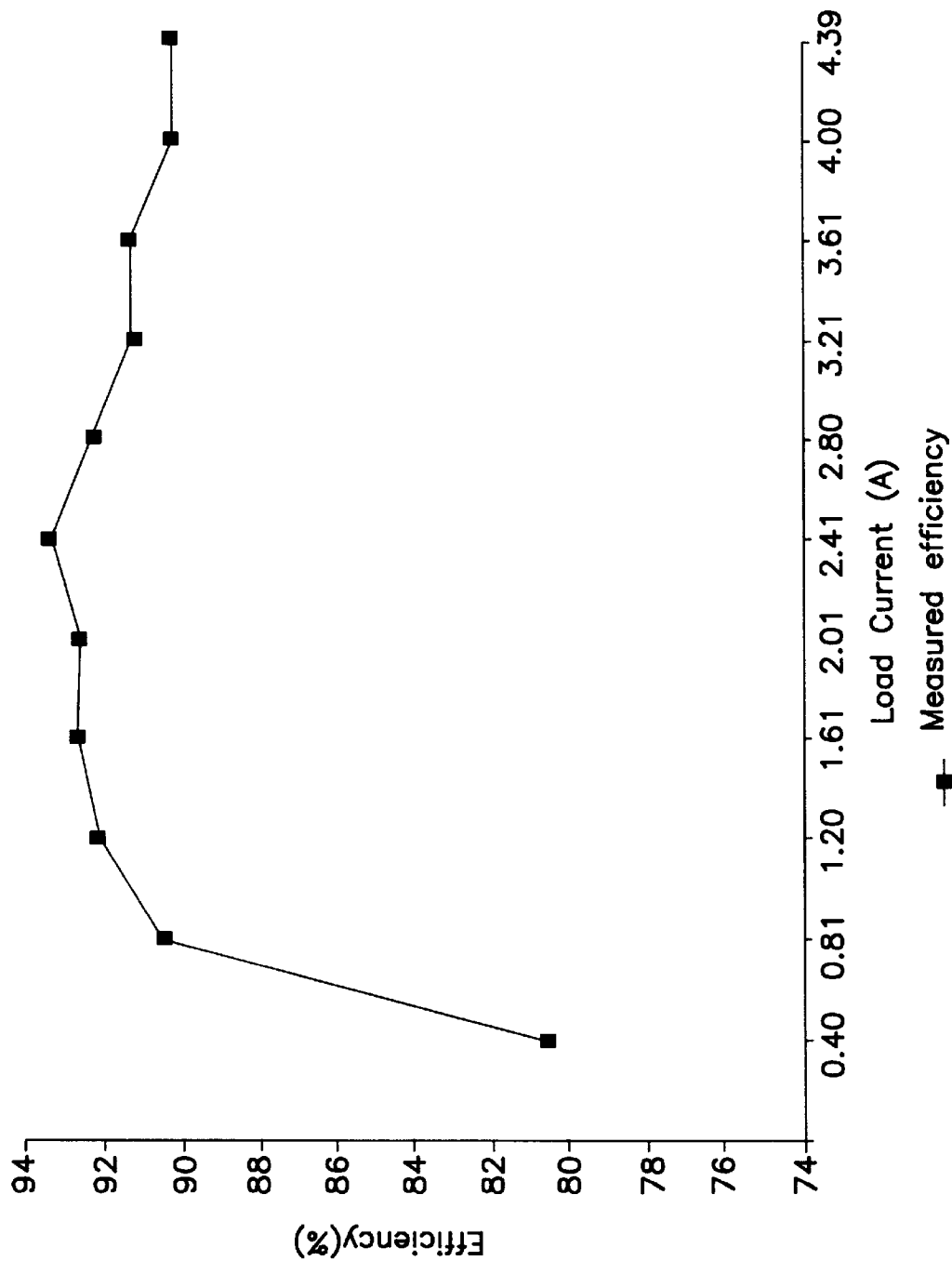
FIG. 4 illustrates a graph showing the efficiency of the converter of FIG. 1 at several load current levels.

FIG. 4 illustrates the measured efficiency of a converter 10 as described above. FIG. 4 shows the best efficiency to be approximately 94%. The efficiency of the converter 10 varies a little with the load current. FIG. 4, however, only reflects a set of measurements and does not depict a ceiling on the possible converter efficiency. Rather, the efficiency may continue to increase as further refinements are made to the converter.

Figure 5:
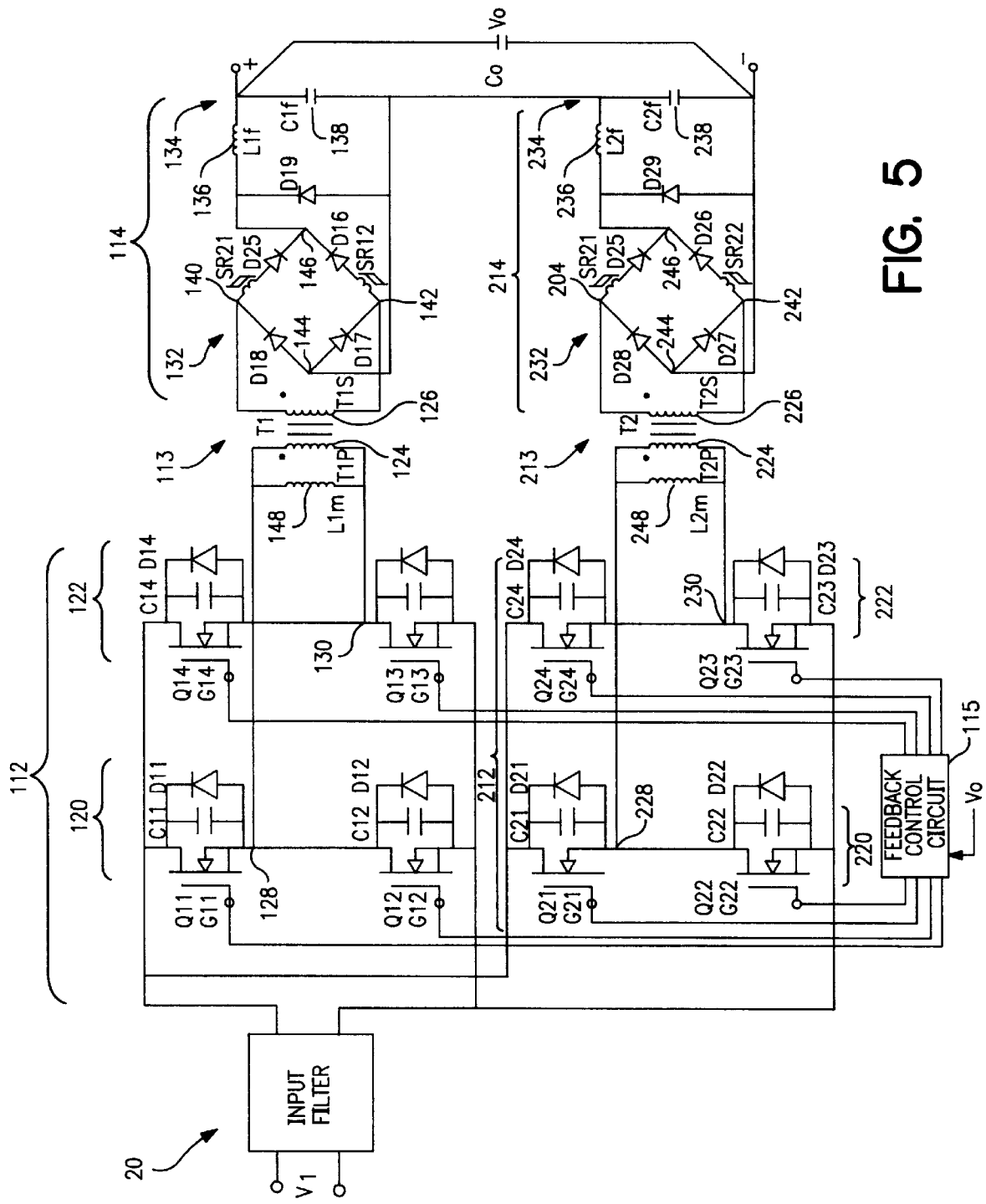
FIG. 5 illustrates an alternative embodiment of the present invention in which two converters have their primary sides connected in parallel to handle twice the input current and their secondary sides connected in series to produce twice the output voltage of a single converter. This parallel/series configuration can be generalized to include n converter modules.

FIG. 5 illustrates an alternative embodiment in which a multiple converter configuration is utilized including two converters 100 and 200 operating with their primary sides 112 and 212 in parallel and their secondary sides 114 and 214 in series. This concept can be generalized to multiple converter configurations using any number of converters 10.

The configuration shown in FIG. 5 has a wide variety of applications. In aerospace applications, for example, the demand for power is increasing rapidly due to the ever-increasing functionality and complexity required in spacecraft electronic systems. Power supplies rated at a few kilowatts are frequently needed to provide power from a 28 V DC bus. Delivering high power at 28 V DC requires the power supply to handle large current. To this end, parallel connection of the primary side 12 of individual converters 10 is an effective approach.

On the other hand, high output voltage is also frequently required for electric propulsion apparatus. To this end, a series connection of the secondary sides 14 of individual converters 10 can generate large output voltages. Therefore, a parallel/series connection of identical converters 10 represents an effective approach for electric propulsion.

Each of converters 100 and 200 individually operates as described above in connection with converter 10. To simplify the explanation of the alternative embodiment, similar elements have been given similar reference numbers, but incremented by 100 or 200, respectively. For instance the leading and trailing legs 20 and 22 of FIG. 1 have been renumbered as leading and trailing legs 120 and 122 in converter 100 and as leading and trailing legs 220 and 222 in converter 200. In addition, elements in converter 10 labelled with a letter followed by a single digit number (e.g., Q1, D4, C3) are relabeled in converters 100 and 200 with the same letter followed by a 2 digit number. Thus, gates G1–G4 of FIG. 1 have been renumbered as gates G11–G14 in the converter 100 and as gates G21–G24 in the converter 200. The explanation of elements which operate in the manner described above in connection with FIG. 1 are not described in detail hereafter.

In the embodiment of FIG. 5, the converters 100 and 200 may be controlled by a common control circuit 115 through PWM switching signals connected to gates G11–G14 and G21–G24. The control circuit 115 phase staggers or delays the PWM switching signals supplied to gates G21–G24 relative to the PWM switching signals supplied to gates G11–G14. Optionally, the PWM switching signals of the upper converter 100 may be phase staggered from the lower converter 200 by approximately 90 degrees in order that the dual configuration converter allows only one of converters 100 and 200 to draw input current at any instant in time. By staggering the control operations, the size, weight and cost of the input filters may be reduced since the filters need not handle as large amounts of ripple current caused when two converters operate simultaneously. The output voltage Vout in FIG. 5 may be twice the voltage produced by an individual converter. The diodes D15–D18 and D25–D28 on the secondary sides 114 and 214 of the transformers 113 and 213 need only handle half of the intended output voltage. This leads to a converter that may use faster, smaller, lighter and less expensive diodes.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

We claim:

1. A pulse width modulated soft switching DC-to-DC converter comprising:

a DC input voltage source;

a transformer with primary and secondary windings, said primary winding including a magnetizing inductance such that said primary winding operates as if an inductor is connected in parallel therewith;

a switching circuit coupling said DC input voltage to said transformer primary winding, said switching circuit comprising a first pair of switching devices connected in parallel with said DC input voltage and a second pair of switching devices connected in parallel with said DC input voltage and said first pair of switching devices, said switching devices selectively turning on and off to convert said DC input voltage to an approximately square wave voltage which is supplied to said primary winding of said transformer;

a rectifying circuit connected to said transformer secondary winding for rectifying an output voltage of said transformer secondary winding, said rectifying circuit comprising first and second legs having first and second saturable reactors connected in series with first and second diodes, respectively, said first and second saturable reactors blocking current flow in the transformer secondary winding when said first diode is in a reverse recovery state and when said transformer secondary winding is in a short circuit state; and a control circuit, connected to an output terminal of said converter and connected to said switching devices, said control circuit generating pulse width modulated (PWM) switching signals turning said switching devices on and off, said control circuit turning on simultaneously a first switching device in said first pair and a third switching device in said second pair at a beginning of an energy transfer stage, said energy transfer stage corresponding to a time period during which said third switching device remains on, said control circuit detecting a voltage level at said output terminal and varying a pulse width of a PWM switching signal that controls said third switching device to vary a time period during which said third switching device remains on based on aid voltage level at said output terminal, said control circuit maintaining said first switching device in an on state after turning said third switching device to an off state for a sufficient period of time to achieve soft switching.

2. A pulse width modulated soft switching DC-to-DC converter according to claim 1, further comprising a free wheeling diode connected in parallel with output terminals of said rectifying circuit.

3. A pulse width modulated soft switching DC-to-DC converter, according to claim 1, further comprising:

a filter circuit connected in parallel with output terminals of said rectifying circuit for performing low pass filtering upon an output of said rectifying circuit.

4. A pulse width modulated soft switching DC-to-DC converter, according to claim 1, wherein said control circuit includes a programmable microcontroller for detecting said voltage level at said output terminal and for controlling pulse widths of said PWM switching signals to control soft switching operations of said first and second pairs of switching devices.

5. A pulse width modulated soft switching DC-to-DC converter, according to claim 1, when said control circuit ends said energy transfer stage by turning off said third switching device in said second pair, said control circuit initiating a trailing leg transition stage when turning off said third switching device.

6. A pulse width modulated soft switching DC-to-DC converter, according to claim 5, wherein said control circuit maintains said trailing leg transition stage from a time at which said third switching device is turned off until a time at which a capacitance of said third switching device approximately equals said DC input voltage and a voltage potential across said primary winding approximates a substantial minimum voltage.

7. A pulse width modulated soft switching DC-to-DC converter, according to claim 1, wherein said second pair of switching devices includes third and fourth switching devices, each of which contains corresponding third and fourth parasitic diodes, said fourth parasitic diode becoming forward biased and entering a conductive state after said control circuit turns off said third switching device, thereby initiating a free-wheeling stage during which current flows through a first switching device, through said primary winding, through said fourth parasitic diode and back through said first switching device.

8. A pulse width modulated soft switching DC-to-DC converter, according to claim 1, wherein said first and second pairs of switching devices comprises first and second, and third and fourth switching devices, respectively, each of which includes a parasitic capacitance and diode said control circuit initiating part one of a leading leg transition stage by turning transistor Q1 off based on a predefined switching frequency during part one of said leading leg transition stage, and inductance of said primary winding driving current flow through a parasitic diode of said fourth switching device, through said DC input voltage source, and through said parasitic diodes of said first and second switching devices in opposite directions, said current returning to said primary winding, said capacitance of said first switching device supplementing current flow through said diode of said first switching device, inductive current flow driven by said inductance of said primary winding decreasing a voltage potential across a capacitor of said second switch to approximately zero, thereby building a voltage potential across said primary winding to equal substantially said DC input voltage, said part one of said leading leg transition stage ending when a voltage potential across said capacitance of said second switching device falls until said diode of said second switching device becomes conductive, thereby clamping said capacitor of said second switching device at a minimum predetermined voltage.

9. A pulse width modulated soft switching DC-to-DC converter, according to claim 1, wherein said first and second pairs of switching devices comprises first and second, and third and fourth switching devices, respectively, said control circuit maintaining said second and fourth switching devices off throughout parts one and two of a leading leg transition stage corresponding to the time period during which current reverses a direction of flow through said primary winding, said control circuit turning on said second and fourth transistors simultaneously to initiate a second energy transfer stage following said parts one and two of said leading leg transition stage.

10. A pulse width modulated soft switching DC-to-DC converter, according to claim 1, wherein said first pair of switching devices includes first and second switching devices and said second pair of switching devices includes third and fourth switching devices, said control circuit simultaneously turning on said first and third switching devices to initiate an energy transfer stage of a first path cycle, said control circuit simultaneously turning on said second and fourth switching devices to initiate an energy transfer stage of a second path cycle, said control circuit ending said energy transfer stages of said first and second half cycles by turning off said third and fourth switching devices, respectively, while maintaining on said first and second switching devices, respectively.

11. A pulse width modulated soft switching DC-to-DC converter, according to claim 1, further comprising a capacitor connected in parallel with said DC input voltage for smoothing said input voltage.

12. A pulse width modulated soft switching DC-to-DC converter, according to claim 1, wherein said first pair of switching devices comprises first and second switching devices connected in series via a first node, said second pair of switching devices comprises third and fourth switching devices connected in series via a second node, said primary winding of said transformer being connected in series with said first and second nodes such that current flows in a first direction through said primary winding when the first and third switching devices are on and such that current flows in a second opposite direction through said primary winding when said second and fourth switching devices are on.

13. A pulse width modulated soft switching DC-to-DC converter, according to claim 1, wherein said first and second saturable reactors act as short circuits while in saturated states while current flows therethrough, said first and second saturable reactors exhibiting high impedance characteristics when in an unsaturated state while no or a minimum current flows therethrough, thereby preventing energy loss associated with diode reverse recovery.

* * * * *